March 31, 1942.     M. P. BROWNE     2,278,101
SLIDING SEAT MOUNTING FOR VEHICLES
Filed Dec. 6, 1934     2 Sheets-Sheet 1
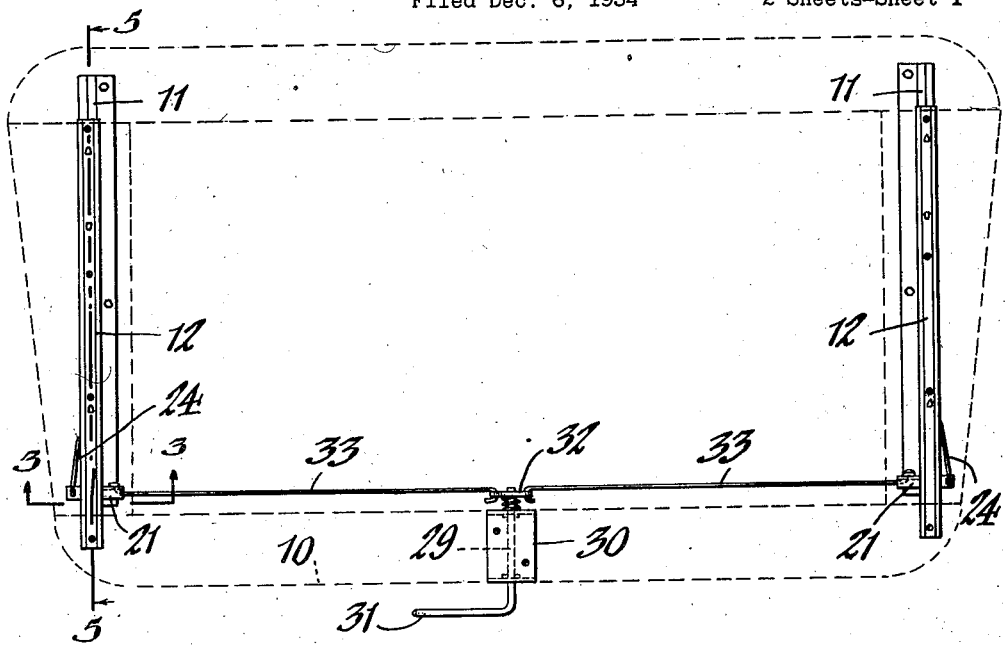
Fig. 1.
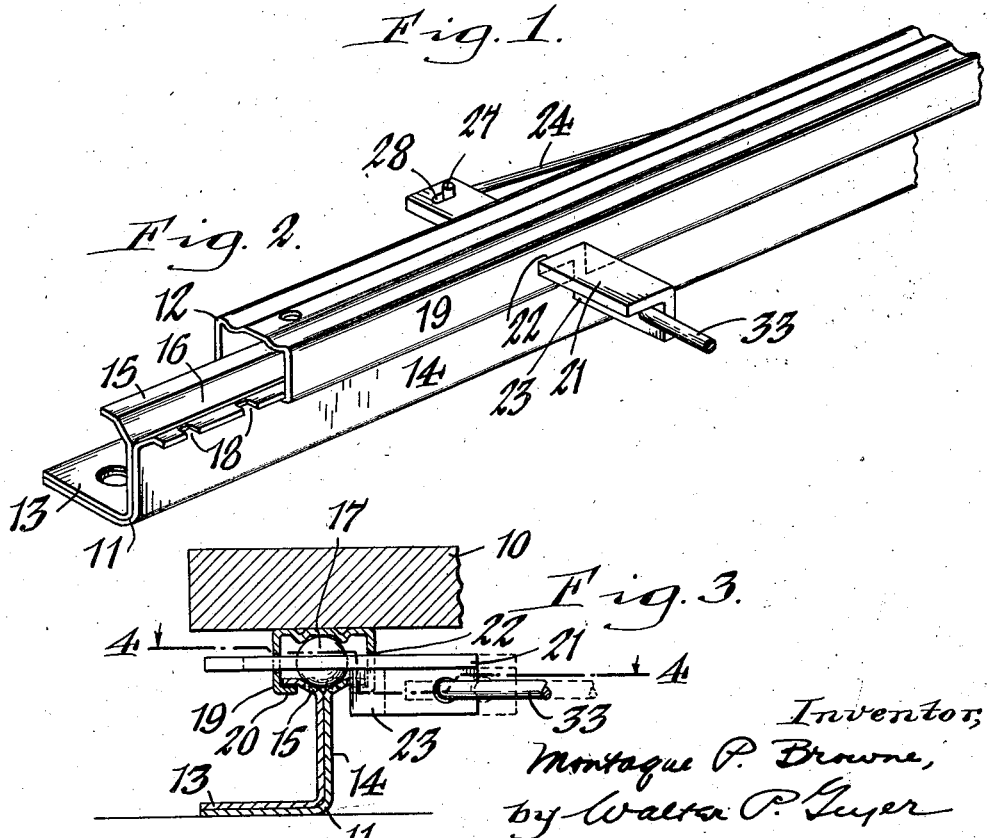
Fig. 2.
Fig. 3.
Inventor,
Montague P. Browne,
by Walter P. Guyer
Attorney.

March 31, 1942. M. P. BROWNE 2,278,101
SLIDING SEAT MOUNTING FOR VEHICLES
Filed Dec. 6, 1934 2 Sheets-Sheet 2
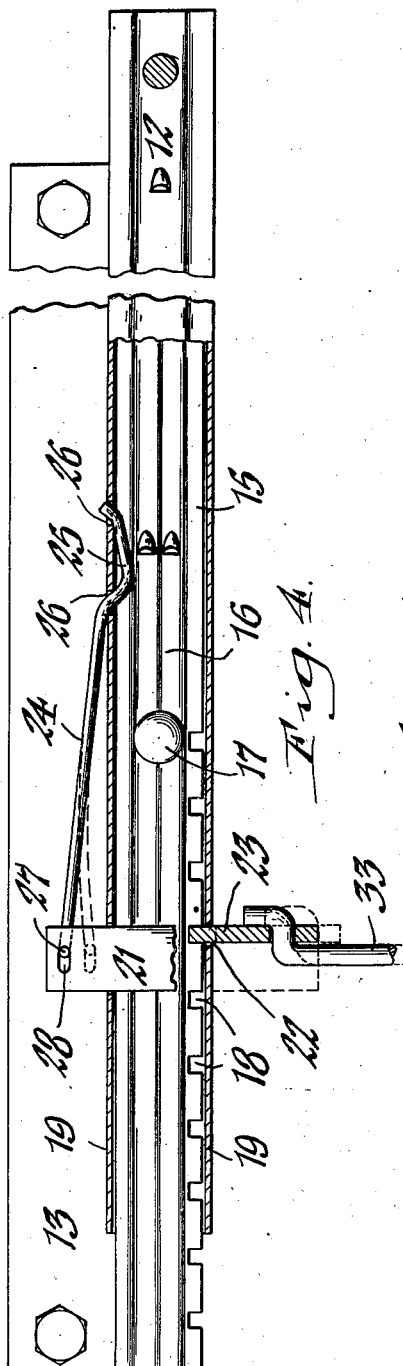
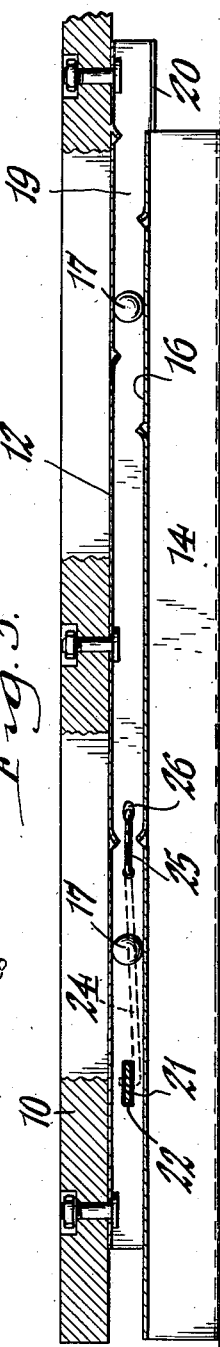
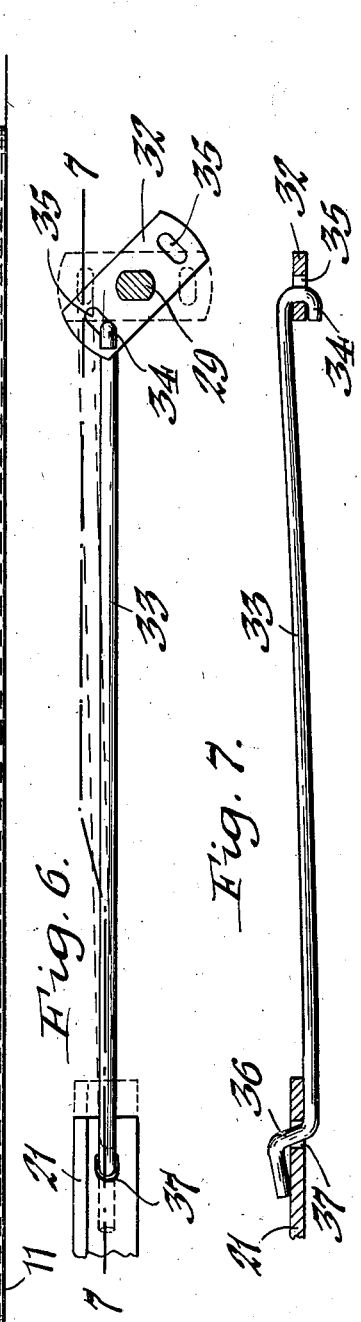
Inventor,
Montague P. Browne,
by Walter P. Geyer
Attorney.

Patented Mar. 31, 1942

2,278,101

UNITED STATES PATENT OFFICE 2,278,101

SLIDING SEAT MOUNTING FOR VEHICLES

Montague P. Browne, Buffalo, N. Y., assignor to Mechanical Devices Corporation of America, Buffalo, N. Y., a corporation of New York Application December 6, 1934, Serial No. 756,296

6 Claims. (Cl. 155—14)

This invention relates to certain new and useful improvements in sliding mountings for the seats of automobiles, where the occupant thereof may adjust the seat to his convenience for driving or to facilitate the ingress and egress of passengers to and from the rear seat of the vehicle.

It has for its object to provide a seat mounting of this character which is so designed as to eliminate objectional rattle and play between the parts and to effect a smooth gliding action of the seat for prompt adjustment, which can be readily installed, and which has simple, positive and inexpensive means for latching the seat in a set position.

In the accompanying drawings:

Figure 1 is a top plan view of the seat mounting, the vehicle seat being shown in outline by dotted lines. Figure 2 is a perspective view of one of the track units and associated latch element embodying my invention. Figure 3 is an enlarged cross section taken on line 3—3, Figure 1. Figure 4 is a horizontal section taken in the plane of line 4—4, Figure 3. Figure 5 is an enlarged longitudinal section taken on line 5—5, Figure 1. Figure 6 is a front view of the connection between the operating handle member and one of the latch bars. Figure 7 is a horizontal section thereof taken on line 7—7, Figure 6.

Similar characters of reference indicate corresponding parts throughout the several views.

By way of example, the invention is shown in connection with a longitudinally adjustable automobile seat, the base frame 10 thereof and the floor of the vehicle having complementary sliding or seat-guiding means which serve to support the seat at its opposite sides and guide it longitudinally when shifting the same to a desired set position.

In the preferred construction of the sliding seat mounting, the same consists of two sets or pairs of complementary guide members or tracks, indicated generally by the numerals 11 and 12, disposed adjacent the opposite side edges of the seat and secured, respectively, by bolts or like fastenings to the floor and underside of seat frame. Each of the floor-engaging tracks 11 consists of a rail having an attaching flange 13 for securing it to the floor, a web or 50 upright portion 14 rising therefrom and a flanged head or guide portion 15 having in its top side a longitudinal guide or race-way 16 adapted to receive a plurality of anti-friction elements, such as ball bearings 17. In one of its longitudinal edges the flanged head 15 is provided with a longitudinal row of latch-engaging elements which may be in the form of notches 18.

The seat-bearing tracks 12 assume a position in spaced superposed relation to the companion floor-engaging tracks and by preference each consists of a substantially channel-shaped rail whose depending side walls 19 terminate at their free ends in inwardly-bent flanges 20 to thereby embrace the flanged head 15 of the floor track in the manner shown in Figure 3. The top wall of the seat-bearing track engages the top sides of the anti-friction elements 17 to thereby afford a free gliding action of the seat relative to the floor. The inturned flanges 20 of the seat rail 12 engage the undersides of the flanged head 15 of the floor rail to thereby prevent vertical separation of the tracks.

Means are provided for latching the seat at the will of its occupant in any desired position of adjustment, such means being associated with each pair of tracks 11, 12 for convenient manipulation by the occupant of the seat. For this purpose I preferably employ a latch bar 21 disposed crosswise of each of the seat-bearing tracks 12 for interlocking engagement with one or another of the locking notches 18 in the companion floor-track. Each of these latch bars extends through the vertical space between the rails formed by the ball bearings 17 and is guided for lateral movement in alining openings 22 formed in the side walls 19 of the seat-bearing track, as seen in Figures 2 and 3, said bar having a flange or tongue 23 thereon at one side of the track which is adapted to interlock with one or another of the locking notches 18. Connected to the other end of the latch bar at the opposite side of the track is a spring for normally maintaining such bar in its latched position. This spring, by preference, is in the form of a resilient wire 24 having a laterally-offset or bent portion 25 at its inner end which is adapted to detachably interlock with adjoining openings 26 formed in the adjacent side wall of the seat-bearing track 12 while its free end terminates in a bent end 27 removably seated in an opening 28 in the adjoining end of the latch bar, as seen in Figures 2 and 4.

The latch bars 21 of the respective guide tracks may be simultaneously actuated from a point substantially centrally at the front end of the seat by a rotatable operating member 29 journaled in a bearing plate 30 secured to the underside of the seat-frame 10 and provided at its front end with a handle 31. At its rear end this operating member has a crank arm 32 to which are joined the inner ends of connecting links 33, the outer ends of the latter being joined to the respective latch bars 21, as shown in Figure 1. By turning the operating member 29 in one direction, the latch bars are simultaneously released to enable the seat to be shifted to a desired position of adjustment, after which, upon release of the handle 31, the springs 24 urge the latch bars to their normally latched position.

By preference, as seen in Figures 6 and 7, each link 33 is provided at its inner end with a hook 34 which engages a transversely-extending slot 35 formed in the crank arm 32, the length of the slot being such as to permit the hook to be inserted laterally therethrough when said crank arm is in its unlatched position shown by dotted lines in Figure 6. In the normal latched position shown by full lines in said figure, the hooked end of link 33 assumes a snug position at one end of the slot 35 and at an angle thereto. The opposite end of the link has a laterally-offset or substantially Z-shaped portion 36 which engages an opening 37 in the latch bar 21. Before installation the link is bowed and inserted first in the latch bar opening and then sprung to bring its hooked end 34 into coupling engagement with the crank arm 32, the resulting tension holding the parts in firmly coupled engagement against rattling.

I claim as my invention:

1. A sliding seat mounting for automobiles and the like, comprising interengageable slide tracks adapted for attachment to the floor and the seat of the vehicle, respectively, one of said tracks having longitudinal flanges thereon and the other having depending side walls terminating in inwardly-bent flanges embracing the corresponding flanges of the companion track, one of the flanges of the latter having a row of latch-engaging elements therein and the side walls of the other track having transversely-alined openings therein, a latch bar mounted in said openings for movement laterally of the tracks and having a part engageable with one or another of said latch-engaging elements to latch the seat in a desired set position, and a spring consisting of a wire extending generally in the direction of the tracks and having one end connected to the latch-bearing track and at its other end to the latch bar.

2. A sliding seat mounting for automobiles and the like, comprising spaced, superposed slide tracks adapted for attachment to the floor and the seat of a vehicle, respectively, anti-friction means disposed between said tracks and spacing the one from the other, one of said tracks having a longitudinal row of latch-engaging elements therein and the other track having side portions extending toward and embracing said first track, said side portions having openings therein aligned transversely of the space between the tracks, a latch bar extending across such space and movably supported in said openings and engageable with one or another of said latch-engaging elements to latch the seat in a desired set position, said latch-bearing track having a pair of adjoining openings therein at one side of the latch bar, and a spring consisting of a wire having a bent portion at one end for detachable interlocking engagement with said pair of openings and connected at its free end to said latch bar for holding the latter in its latched position.

3. A sliding seat mounting for automobiles and the like, comprising relatively movable track-sections, a latch applied to one of said sections, the other track-section having means with which said latch is adapted to engage for latching the seat in a set position of adjustment, the latch-bearing track-section having a pair of openings therein at one side of the latch, and a wire spring for constantly urging said latch to its latched position, one end of said spring having a laterally offset anchoring portion for detachable, threaded interlocking engagement with said pair of openings and the free end of said spring engaging the latch.

4. A sliding seat mounting for automobiles and the like, comprising relatively movable track-sections, a latch applied to one of the track sections and releasably engageable with the companion section for latching the track-sections in a set position of seat adjustment, said latch having an opening therein, and means for controlling said latch including an actuating crank having an opening therein, and a link connecting the crank with said latch, said link having a hook at one end for detachable interlocking engagement with the crank-opening and a laterally offset portion at its other end for coupling engagement with the latch-opening, said link being normally bowed and tensioned in one direction, whereby its end connections with the crank arm and latch are held against rattling and displacement.

5. As an article of manufacture, a seat support adapted to be fastened to a floor and to the bottom of a seat, said support comprising a track arranged to be fastened to the floor, said track having oppositely directed longitudinal flanges on the top thereof, a slide of inverted channel cross-section arranged to be fastened by its top wall to the bottom of a seat in alignment with the track and having guide portions on the side walls engaging the flanges, a latch mounted on said slide for reciprocation transversely with respect to the longitudinal flanges and having portions arranged to engage in notches provided therefor in the longitudinal edge of one of said flanges in longitudinally spaced relation, one end of said latch projecting from the side of the slide, a substantially straight spring hooked at one end for detachable bearing engagement in an opening provided therefor in the side wall of the slide and having its free end arranged to engage in a slot provided therefor in the projecting portion of said latch, said spring tending normally to move the latch in one direction, and manually operable means for moving the latch in the other direction.

6. As an article of manufacture, a track for an adjustable seat adapted to support a seat supporting slide thereon for endwise movement with respect thereto, said track comprising an elongated sheet metal body member constructed at the bottom thereof for fastening to the floor and formed at the top to provide a laterally projecting longitudinal flange for guiding a slide, a companion sheet metal flange member fastened to the side of the body member and formed to provide another longitudinal flange projecting laterally in the opposite direction with respect to the other flange for guiding the slide, the body member and flange member being conformed with respect to one another at their junction to provide therebetween a substantially V-shaped ball race adapted to receive balls for supporting the slide on the track with rolling friction, and one of said body and flange members having lugs formed from the flange thereof projecting upwardly in the ball race to provide limiting and retaining abutments for the balls, substantially as described.

MONTAGUE P. BROWNE.